(12) United States Patent  (10) Patent No.: US 8,939,703 B1
Lawrence  (45) Date of Patent: Jan. 27, 2015

(54) HUB AND SPOKE SYSTEM FOR SHIPPING LESS THAN FULL LOAD INCREMENTS

(76) Inventor: James Lawrence, Waynesboro, TN (US)

( * ) Notice: Subject to any disclaimer, the term of this patent is extended or adjusted under 35 U.S.C. 154(b) by 442 days.

(21) Appl. No.: 13/481,259

(22) Filed: Jun. 14, 2012

(51) Int. Cl.
*B65F 9/00* (2006.01)

(52) U.S. Cl.
USPC ........ 414/809; 220/62; 229/198.1; 229/198.2

(58) Field of Classification Search
USPC ................. 414/809, 812; 220/62; 229/198.1, 229/198.3; 190/107
See application file for complete search history.

(56) References Cited

U.S. PATENT DOCUMENTS

| 4,179,997 A | 12/1979 | Kirwin |
| 4,685,399 A | 8/1987 | Baker |
| 5,017,064 A | 5/1991 | Kirwin |
| 5,107,772 A | 4/1992 | Viens |
| 6,089,802 A | 7/2000 | Bullock |
| 6,105,525 A | 8/2000 | Rapeli |
| 6,123,029 A | 9/2000 | Monley |
| 6,364,154 B2 | 4/2002 | Kruzick et al. |
| 6,460,468 B1 | 10/2002 | Mobley |
| 6,599,082 B2 | 7/2003 | Lawrence |
| 7,703,632 B2 | 4/2010 | Kochanowski |
| 7,753,222 B1 | 7/2010 | Heinrichs |
| 8,011,523 B2 | 9/2011 | Kochanowski |
| 8,113,372 B2 | 2/2012 | Bellehumeur et al. |

*Primary Examiner* — Saul Rodriguez
*Assistant Examiner* — Emery Hassan
(74) *Attorney, Agent, or Firm* — John E. Vanderburgh

(57) ABSTRACT

A system for the shipment of less than a full load in a secured collapsible sub-container from the shipper's location to a first central hub for combination with other partial shipments to make a full load for transfer to a second hub and ultimate delivery to a destination. The sub-container being readily foldable for storage in a full load freight container without taking up freight carrying capacity.

10 Claims, 7 Drawing Sheets

HUB AND SPOKE SYSTEM FOR SHIPPING LESS THAN FULL LOAD INCREMENTS

FIELD OF THE INVENTION

This invention is in the field of the shipment of goods and more particularly to the shipment of smaller items such as parcels.

BACKGROUND OF THE INVENTION

Surface freight is normally shipped in increments of full trailer or full sea sub-container amounts particularly if shipping is contracted to a carrier to maintain "positive control" over the shipment. Positive control requires a verification process to determine if the shipment has been tampered with. For example, positive control shipping by truck requires that the trailer be sealed once the items have been loaded. For less than full trailer loads, however, the carrier normally picks up the freight at the shipper's site and takes it to a hub where it may be combined with other shipments to make a full load. This presents a major problem to smaller shippers and shippers of parcels such as the major parcel shippers such as UPS or Federal Express who require positive control over their shipments.

In the case of less than full truck load shipments under positive control it is not possible to add other shipment increments to fill the trailer because it is sealed and the shipper must pay for a full load even though the shipment is less than a full load. This presents a cost problem even to the major parcel shippers who contract out their surface shipments and who require positive control. In addition, the system may be unbalanced, that is for the return trip the trailer may be empty of freight, however, pallets and containers for bulk items must be repositioned to the originating hub. This raises the cost of shipping since the cost of the return trip is passed on to the shipper.

Shipping containers for bulk items and parcels are normally large and bulky and make the return trip for relocation of the empty containers expensive and inconvenient. To overcome this, collapsible shipping containers have been designed to reduce the space necessary to ship the containers back to a hub for reuse. These containers may require special tools and hardware to erect the container and are expensive or may be heavy and difficult to handle without the need for mechanical assistance, such as a fork lift.

Accordingly there is a need for a hub to hub shipping system that can be operated efficiently and inexpensively for the shipment of bulk items and parcels with positive control even in less than full trailer increments.

DEFINITIONS

As used herein the term "hub and spoke" refers to a transportation network that a utilizes central point (hub) to collect and sort small shipments from various origin locations (spoke) for combination into a full trailer van or sea container load for shipment to a receiving hub at which the smaller shipments are separated for delivery to their destination.

"Full Load" refers to a shipment of items the fills the capacity of a full load freight container such as a trailer van or sea container.

The term "sub-container" refers to a smaller container for shipments in increments of less than a full load (LTL) for a trailer van or sea container. The sub-container is combined with other LTL increments to make up a full load.

"Positive Control" refers to the ability to secure the individual LTL shipment from its origin to its destination.

"Sub-Container System" (SCS) refers to a transportation network utilizing sub-containers to make up full loads while maintaining positive control "Unbalanced" refers to a transportation network in which trips carrying full loads are moved in one direction while return trips are empty or only partially loaded.

SUMMARY OF THE INVENTION

Accordingly it is an object of the invention to provide a balanced system for hub and spoke shipping.

Another object of the invention is to provide a system for the shipment of less than a full load from the shipper's location to a first hub for combination with other shipments to make a full load for transfer to a second hub and ultimate delivery to a destination.

Another object of the invention is to provide a system for hub and spoke shipping that provides security and positive control over less than a full load.

Another object is to provide a system utilizing collapsible sub-containers for hub and spoke shipping that are light weight, inexpensive and is convenient to erect and collapse.

Another object of the invention is to provide a system utilizing sub-containers for hub and spoke shipping the can be loaded and off loaded in the origin and destination facilities.

Yet another object is to provide a system utilizing sub-containers that can be collapsed and stowed on a trailer van or sea container without substantially reducing the freight capacity of the trailer van or sea container so they can be shipped back to the origin without loss of a payload.

In accordance with the invention a system for hub and spoke shipping is described in which the item or items to be shipped in less than full load increments are loaded into a collapsible sub-container at the origin facility and the sub-container is sealed at the origin location. The sub-container is shipped to a first hub for combination with other sub-containers or LTL increments to make a full load. The full load is shipped to a second hub where the full load is broken down for delivery of the sub-container to its destination location.

The sub-container is defined by a floor, top, front, rear and side panels to form an enclosure for containing items to be shipped. In a preferred embodiment the panels comprise light weight frame members over which is laid a flexible but tough material. The panels may also comprise a composite material or a closed cell foam such as expanded polypropylene, for added strength. The side panels are pivotally attached to the floor for folding and nesting thereon when the sub-container is collapsed. The rear, top and front panels can be pivotally joined for folding together and nesting on a folded side wall when the sub-container is collapsed. Alternatively the rear, top and front panels can be defined by a single sheet of a tough, flexible material that is secured at one edge to the rear edge of the floor and which can be rolled up or folded when the sub-container is collapsed or by sheets of the tough, flexible material removably secured the light weight frame members forming the side panels. Industrial zippers secure the panels together when the sub-container is erected.

DESCRIPTION OF THE PREFERRED EMBODIMENTS

The invention will be described in conjunction with over-the-road or dry van shipments where goods are carried by trailer van. However, it will be understood that the method and apparatus of the invention is applied to sea and rail containers as well air shipments.

Shipments of goods in less than full trailer van increments can be a problem to the shipper as normally shipments must be full loads. Thus the shipper may be forced to pay for a full load for a less than full load, especially if positive control over the shipment is desired. For example to maintain positive control for an over-the-road shipment the trailer van is sealed at the origination of the shipment and the seal should not be broken until the destination has been reached. Comingling of other shipments to achieve a full load cannot be accomplished once the trailer van is sealed.

Spoke and hub systems likewise face a problem with positive control. These systems are ideally suited for small increment shipments which can be comingled into full loads at a hub for shipment to a second hub. However, maintaining positive control over the individual smaller shipments presents a security problem. When shipping is contracted out the shipper cannot be certain the integrity of the shipment has not been breached.

Figure 1:
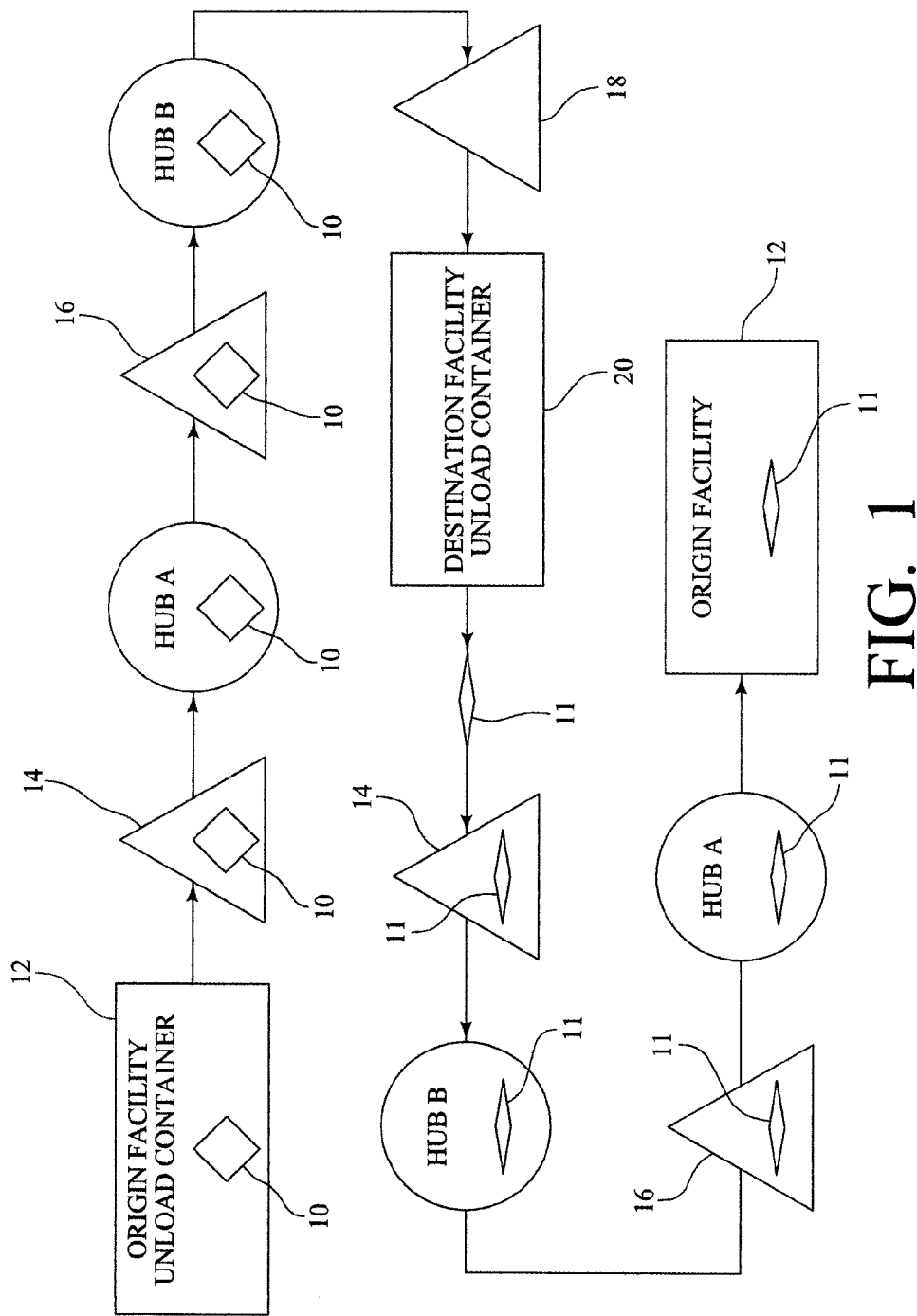
FIG. 1 is a flow diagram illustrating a hub and spoke shipping system in accordance with the invention.
Figure 2:
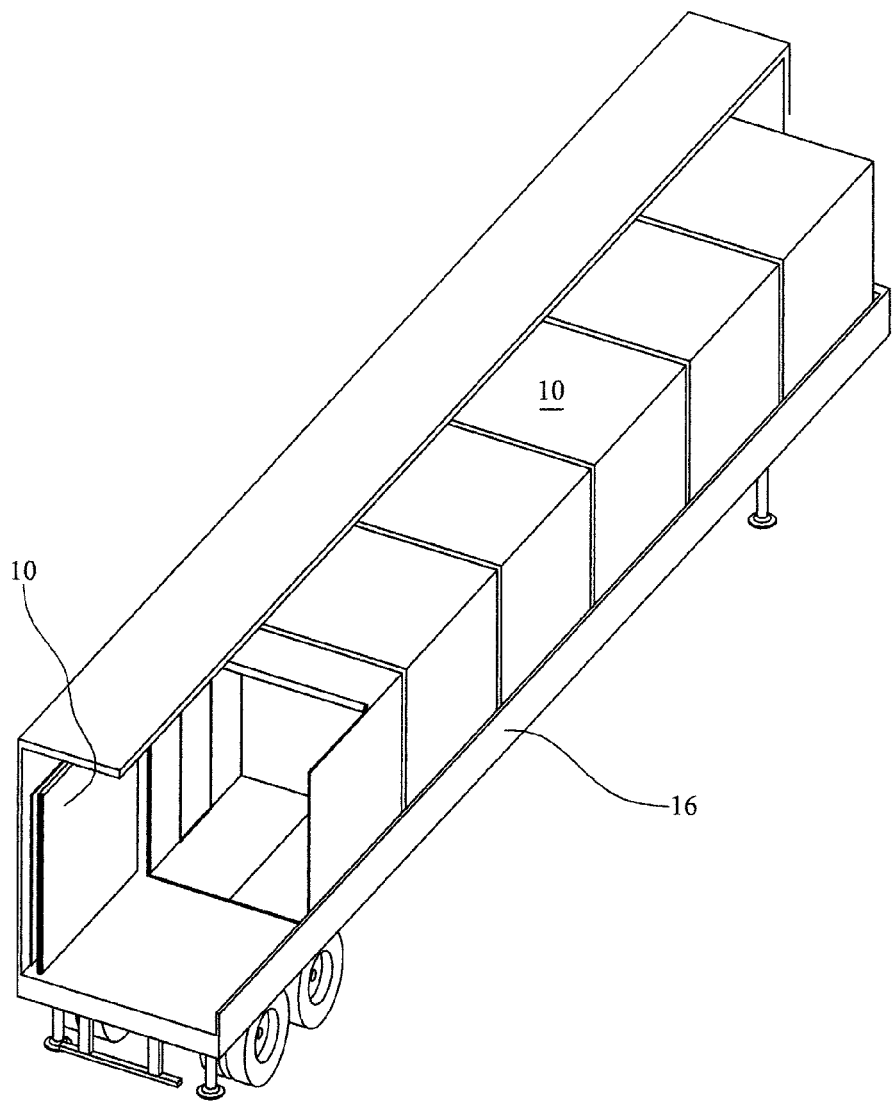
FIG. 2 is a trailer van partially broken away showing it being loaded with erected sub-containers and having collapsed sub-containers stowed along one sidewall.

Referring to FIG. 1 a system for hub and spoke shipping is illustrated in which shipping increments of less than full load can be economically shipped with assurance that positive control is maintained throughout the shipping system. For purposes of illustration FIG. 1 will be described in connection with overland shipment. As illustrated items to be shipped are loaded in a sub-container 10 at the origin facility 12. The sub-container 10 can be conveniently brought into the facility 12 and be positioned, for example, at the end of a conveyor line, for loading the items into the sub-container. When loaded, the sub-container 10 is sealed and transferred to a local carrier 14 for shipment to a central hub, which for the purposes of description is designated as Hub A. As shown in FIG. 2 at Hub A the loaded and sealed sub-container 10 is loaded on a full load container such as trailer van 16 along with other sub-containers to make a full load for shipment to a destination hub, Hub B. At Hub B the sealed sub-container 10 transferred by a second local carrier to a destination facility 20 were it is unsealed and unloaded. Positive control over the shipment is maintained through each step from the origin facility 12 to the destination facility 20.

The Department of Transportation (DOT) sets the size specifications for dry trailer vans to not exceed 53 feet in length, 8.5 feet in width and 13.5 feet in height. Accordingly the sub-container 10 is sized both to fit economically in the trailer van and also to be conveniently handled for loading and unloading. For ease of handling items to be shipped are often first loaded on pallets. Pallet size is important because the company responsible for shipping the goods needs to fit as many pallets as possible on each truck and Transport companies charge higher fees for over-sized pallets or pallets that cause wasted space. Thus, while pallets may come in a variety of sizes for specialized freight, transportation companies normally use pallets of the following sizes in feet; 3×3, 3.5×3.5, 4×4, 4×3.5 and 4×3.3. Accordingly the sub-containers 10 are similarly sized to receive one or two pallets. For goods that do not lend themselves to palletizing or are otherwise not palletized the sub-container may be as wide as 8 feet.

Figure 3:
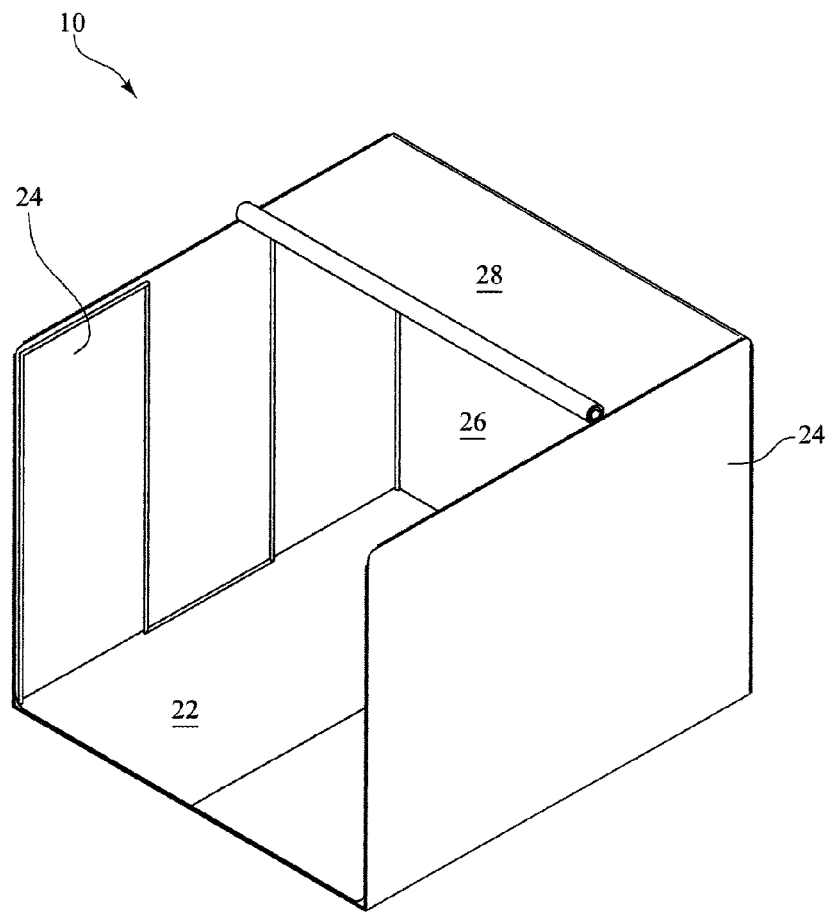
FIG. 3 is an isometric view of a sub-container in accordance with the invention illustrating one embodiment where the rear, top and front panels are formed of a single sheet of material and top and front panels have not been completely covered.
Figure 4:
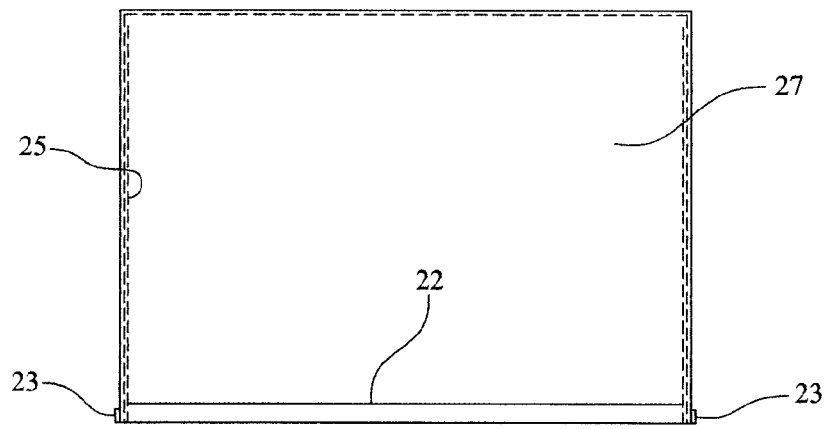
FIG. 4 is a side view of the sub-container of FIG. 3.
Figure 5:
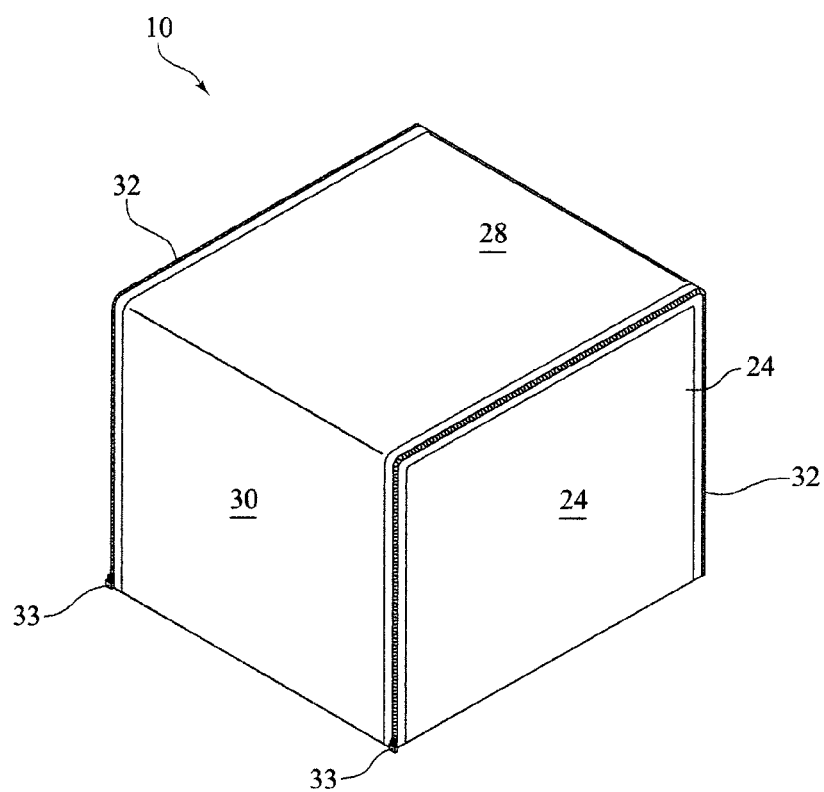
FIG. 5 is an isometric view of a sub-container according to the invention fully loaded and secured.

Referring to FIGS. 3, 4 and 5 there is shown one embodiment of a sub-container 10 in accordance with the invention. The sub-container 10 comprises a floor panel 22, side panels 24, a rear panel 26, top panel 28, and a front panel 30. The floor panel 22 may be comprised of a substantially rigid, tough material such as, for example, thermoset resin bonded fibers, high density polyethylene, plywood and may be configured to receive the tines of a forklift for convenient movement of the loaded sub-container 10. As illustrated in FIG. 4 each side panel 24 consists of a light weight frame member 25 covered with a tough, flexible poly fabric 27 such as woven polypropylene. The rear panel 26, the top panel 28 and the front panel 30 are formed by a single sheet of the poly fabric 27. Alternatively, the poly fabric 27 may be in the form of a bag which is supported by the frame members 25 to define integral side panels 24, rear panel 26 and the top panel 28. The front panel 30 is attached to the front edge of the top panel at its upper edge so as to define a flap which can be opened to allow access to the interior of the sub-container 10.

Figure 7:
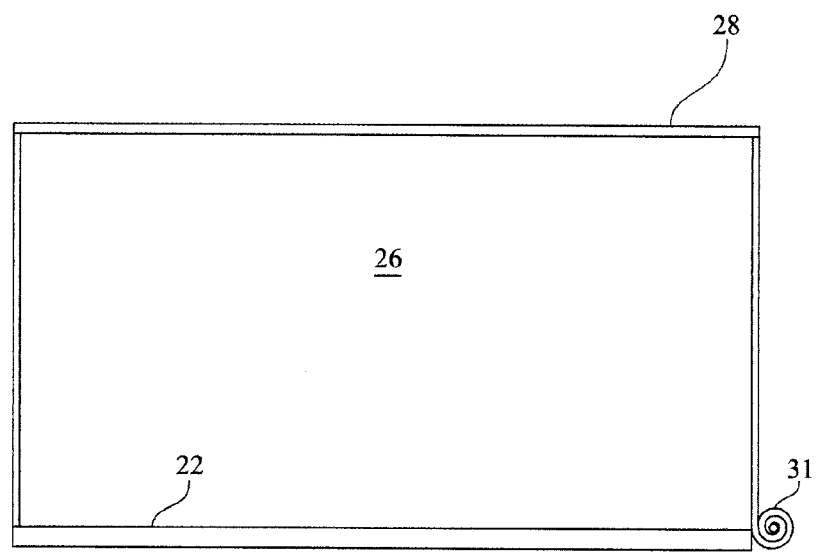
FIG. 7 is a side view of the sub-container of FIG. 6 showing a roll of sheet material that when unrolled forms the rear, top and front panels.

As shown in FIG. 3 the sub-container 10 is open for loading and the poly fabric has covered only a portion of the top panel 28 leaving the front panel 30 open for access to the interior of the sub-container 10. As shown in FIG. 7 the single sheet of poly fabric 27 is most conveniently stored as a roll 31 attached to the front or rear edge of the floor panel 22 until needed to form the panels as described. As illustrated the roll 31 is located on the rear edge of the floor panel 22.

A fully loaded and secured sub-container 10 is shown in FIG. 5. Security is achieved by industrial zipper fasteners 32 comprising tape pairs carrying opposed teeth secured along the contiguous edges of the poly fabric forming the panels. As shown the zipper fasteners 32 are continuous around the contiguous edges of the panels and are secured by padlocks 33 when the fastener is closed. In an alternative embodiment in which the side panels 24, the rear panel 26 and the top panel 28 are integrally formed as a bag and the front panel 30 defines a flap the front panel is secured by the zipper fasteners 32 being disposed along the contiguous edges of the front panel and the side panels.

Figure 9:
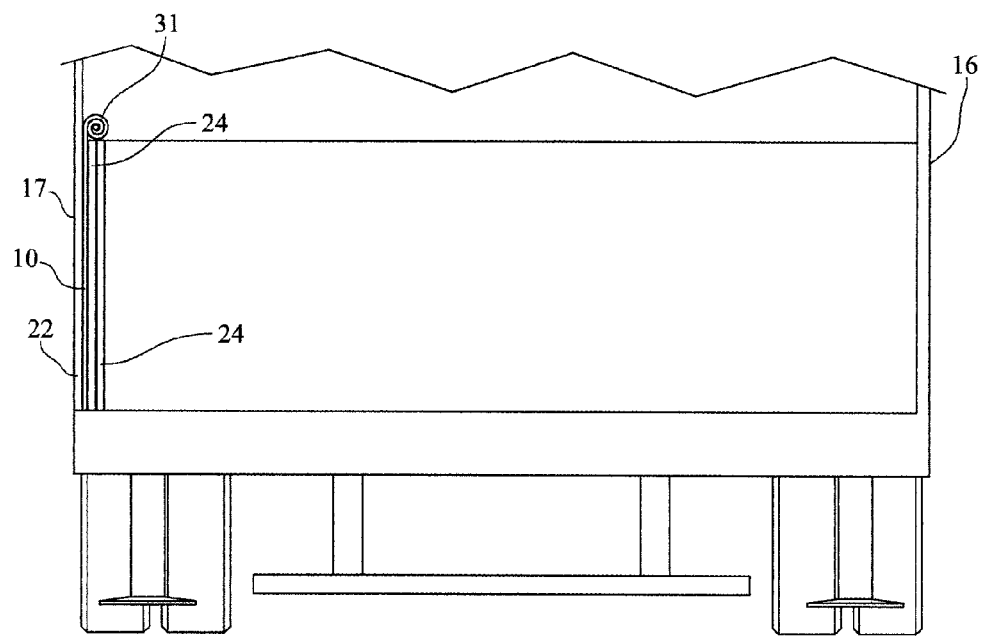
FIG. 9 is an end section of a trailer van illustrating a collapsed sub-container stowed against a side wall of the trailer van.

If there are items to be shipped from the destination facility 20 to Hub B for transshipment to other hubs, the sub-container can be re-loaded and returned to Hub B for shipment to another hub such as Hub B. However, as is often the case the destination facility 20 has nothing to ship and the empty sub-containers 10 need to be returned through Hub B to the origin facility 12 for reuse. With conventional freight containers a part or all of a trailer van is required to ship the containers back to the origin facility 12 resulting in loss of some or all of the cargo space that could otherwise be used for paying freight. The cost of this is normally passed on to the shipping customer. The sub-container 10 is readily collapsed (11 in FIG. 1) and as illustrated in FIG. 2 and FIG. 9 is conveniently stowed out of the way against a side of the trailer van 16. The cargo area is free and can contain additional loaded sub-containers 10 or other types of freight containers or pallets so that sub-containers can be returned to the origin facility in a freight loaded trailer van.

Figure 6:
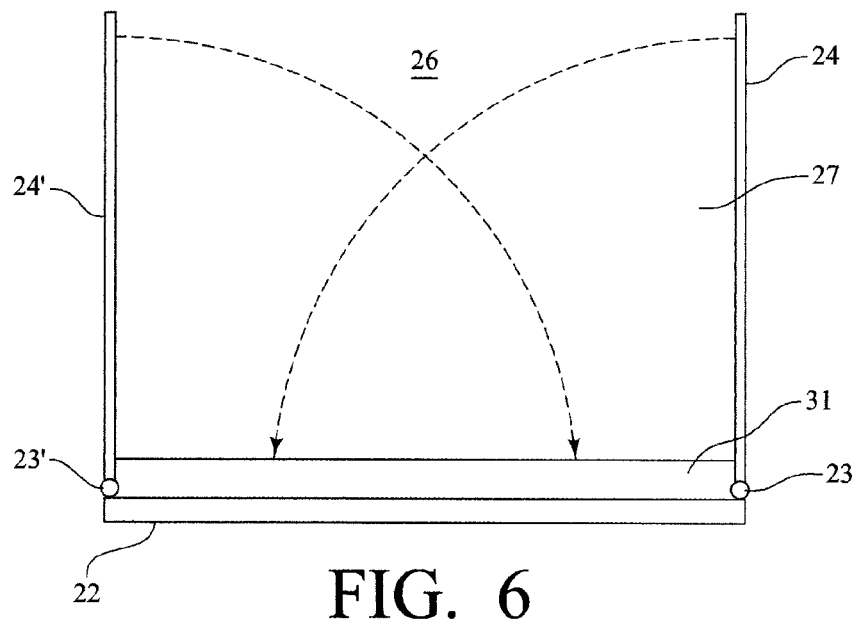
FIG. 6 is an end view of the sub-container of the invention fully erected illustrating the folding of the side panels.
Figure 8:
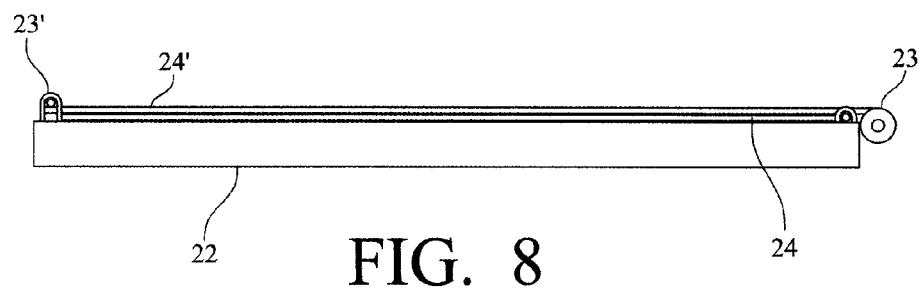
FIG. 8 is a side view of the sub-container fully collapsed.

Referring to FIG. 6 and FIG. 8 the sub-container 10 is collapsed by removing or rolling back the sheet of material forming front panel 30, the top panel 28 and rear panel 26. The right side panel 24 and the left side panel 24' are then free to pivot inwardly against the floor panel 22. Each of the lower ends of the frame member 25 of side panel 24 is provided with a pin (not shown) that is journaled in a plane bearing 23 so that the side panel lies flat against the floor panel when collapsed. Likewise each lower end of the frame member 25 of the side panel 24' is provided with a pin that is journaled in a plain bearing 23'. The bearing surface of the plain bearing 23' is vertically elongated allowing the frame member 25 to lift vertically as the side panel 24' is rotating down so as to allow the side panel 24' to lie flat on the side panel 24 when the sub-container 10 is fully collapsed. The sub-container in its collapsed configuration 11 can then be stowed against the side of a trailer van leaving the cargo space free.

Figure 10:
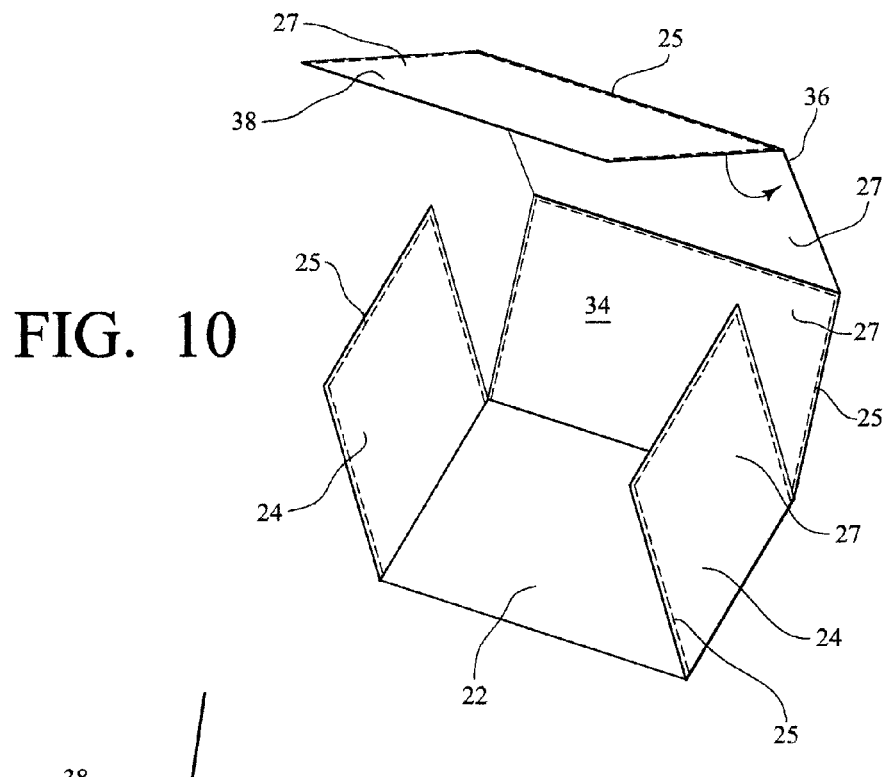
FIG. 10 is an isometric view of another embodiment of a collapsible sub-container.
Figure 11:
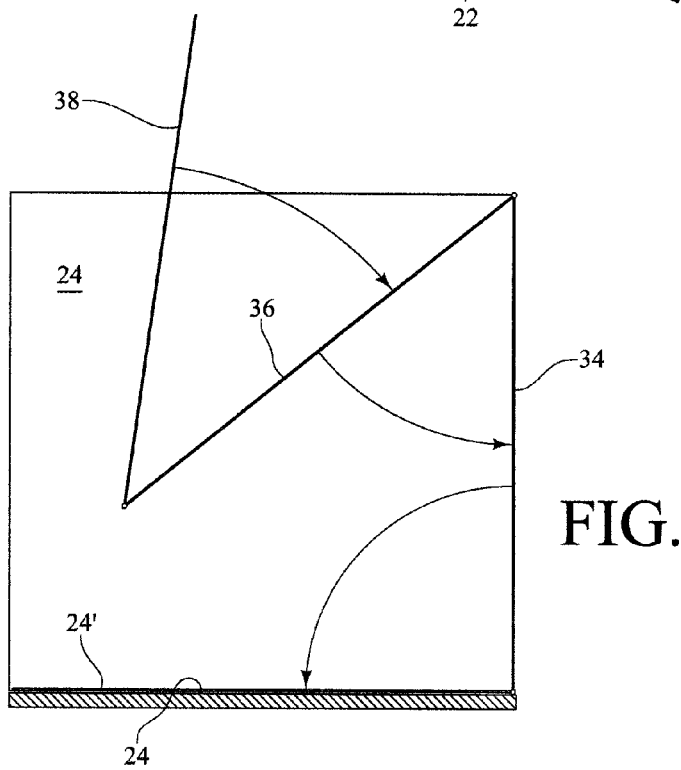
FIG. 11 is a side view illustrating folding of the front, top and rear panels of the sub-container of FIG. 10.

Another embodiment of the sub-container is illustrated in FIG. 10 and FIG. 11 where like reference numbers refer to like parts. In this embodiment the floor panel 22 and the side panels 24 are as described above. A rear panel member 34 is pivotally attached to the rear edge of the floor panel 22. A top panel member 36 is pivotally attached to the rear panel member 34 while a front panel member 38 is pivotally attached to the top panel member. The panel members 34, 36 and 38 are constructed as described for the construction of the side panels 24. That is each of the panel members 34, 36 and 38 comprise a lightweight frame 25 covered by high strength poly fabric 27.

The sub-container 10 can be collapsed for stowage along a side of a trailer without interference with the cargo space. As most clearly shown in FIG. 11 the side panel 24 is pivoted to lie on the floor panel 22 and side panel 24' overlies side panel 24. The front panel member 38 is pivoted to lie over the top panel member 36 which is pivoted to lie against the inner surface of the rear panel member 38. The rear panel member is pivoted downwardly so the all three panel members overlie the side panel 24'.

The embodiment shown in FIG. 11 and FIG. 12 is more amenable to being stacked since the panel members 34, 36 and 38 are reinforced with the light weight frame members 25 which provide more rigidity overall to the sub-container 10. The sub-container is secured in the same manner as described in connection with FIG. 5.

While the invention has been described in connection with certain preferred embodiments it will understood that modifications may be made which lie within the spirit and scope of the invention as defined by the claims appended hereto.

The invention claimed is:

1. A hub and spoke method of shipping freight comprising the steps of: a. loading less than a full load of items at an origination site into a collapsible sub-container; b. transferring the loaded collapsible sub-container to a first central hub; c. integrating the loaded collapsible sub-container with other less than full load items to make up a full load for transfer to a second central hub; d. transferring the loaded collapsible sub-container from the second central huh to a destination site; e. unloading the loaded collapsible sub-container and reloading for return shipment to the origination site; wherein the sub-container is defined by a floor panel having side, front and rear edges and top, front, rear and side panels to form an enclosure for containing items to be shipped, the rear, top and front panels being formed of a single sheet of a flexible material and the side panels being pivotally attached to the floor panel to fold inwardly toward each other to lie over the floor panel when the sub-container is collapsed; wherein the single sheet of flexible material is removed prior to folding the side panels; wherein the single sheet of flexible material is stored as a roll on the rear edge of the floor panel when the sub-container is collapsed.

2. The hub and spoke system of claim 1 wherein the sub-container is collapsed for transfer back to the origination site in the event that there are no items to be returned to the origination site.

3. The hub and spoke system of claim 1 wherein the sub-container is secured at the origination site and remains secured until it reaches the destination site.

4. The hub and spoke system of claim 1 wherein the rear, top, and the side panels are integrally formed and the front panel is attached to the front edge of the top panel so as to define a flap to permit access to the interior of the sub-container.

5. The hub and spoke system of claim 1 wherein the side panels comprise a light weight frame defining a pair of vertical members defining the front and rear sides of the panel and a member extending perpendicularly between the vertical members to connect the vertical members and to define the top edge of the panel, the frame being covered by a flexible poly fabric.

6. The hub and spoke system of claim 5 wherein the vertical members of each of the side panel frame are pivotally connected to the floor panel by a pin in the lower end of the vertical member journeled in a bearing surface of a plane bearing on the floor panel.

7. The hub and spoke system of claim 6 wherein the vertical members of one of the side panels are pivotally connected to the floor panel by a plane bearing having a bearing surface vertically elongated allowing the frame member to lift vertically as the side panel is rotating down permitting it to lie flat on the opposite side panel when the sub-container is fully collapsed.

8. The hub and spoke system of claim 1 wherein the sub-container is defined by a floor panel having side, front and rear edges and top, front, rear and side panels to form an enclosure for containing items to be shipped, the rear, top and front panels each comprising a light weight frame defining top, bottom and side edges of the panels and being covered with a high strength poly fabric, the edge of the front panel contiguous to the top panel edge being pivotally connected thereto for folding the front panel over the top panel, the opposite edge of the top panel contiguous to the rear panel edge being pivotally connected thereto for folding over the rear panel and the rear panel being pivotally connected to the floor panel for folding over the floor panel;

whereby the front and top panels are folded against the rear panel and the front, top and rear panels overlie the floor panel when the sub-container is collapsed.

9. The spoke and hub system of claim 3 wherein the sub-container is secured by continuous zipper fasteners disposed along contiguous edges of the panels to provide positive control over the items being shipped in the container.

10. The spoke and hub system of claim 4 wherein the sub-container is secured zipper fasteners disposed along the contiguous edges of the front panel and the side panels.

* * * * *